Aug. 28, 1956     F. E. BERGERON     2,760,585
APPARATUS FOR APPLYING LUBRICANT TO THREADED CONNECTIONS
Filed Nov. 24, 1952
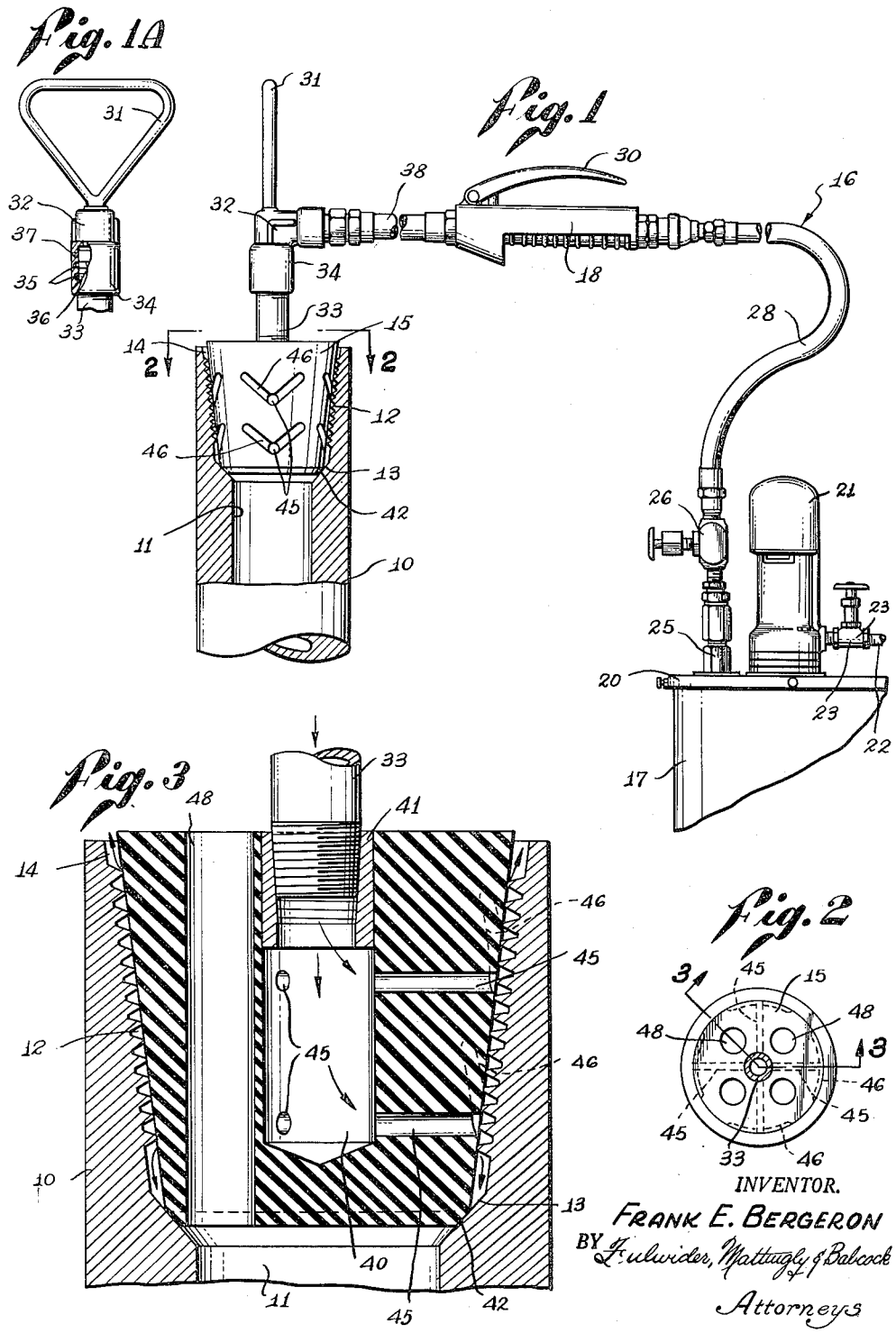
INVENTOR.
FRANK E. BERGERON
BY Fulwider, Mattingly & Babcock
Attorneys United States Patent Office 2,760,585
Patented Aug. 28, 1956

2,760,585

APPARATUS FOR APPLYING LUBRICANT TO THREADED CONNECTIONS

Frank E. Bergeron, Glendale, Calif.

Application November 24, 1952, Serial No. 322,199

7 Claims. (Cl. 166—243)

My invention relates generally to oil well equipment, and more particularly, to means for applying lubricant to threaded connections of well casing, drill pipe or tubing.

In the drilling and servicing of oil wells extended lengths of pipe must be made up by coupling together joints or stands of pipe with threaded connections. To insure the joints being made up tightly and prevent thread galling or jamming because of dirt and foreign matter, it is common practice to apply a heavy grease-like lubricant to the threaded connections. This is normally done by applying a coating of lubricant to the internal threaded section of the box end of the pipe. In the past, the lubricant has been applied by means of a brush or swab from an open bucket of grease standing on the rig floor.

When the grease is applied by such former methods, it is impossible to properly gauge the amount of grease applied to the threads and excessive amounts are applied. Much of the grease is spilled and lost down the bore of the pipe and the grease in the open container is subject to contamination from the dirt and mud around the rig. Many gallons of expensive lubricant are thus wasted, and in addition the operation is time-consuming and unsatisfactory.

In many cases, when the pipe is pulled from the hole, the well pressure causes well fluid to continue to flow over the top of the pipe as each joint is broken. If the flow continues, the threaded connection cannot be properly cleaned and lubricated as the joints are pulled. Even if the flow is stopped, the presence of contaminating well fluid requires that the threads be cleaned as well as lubricated. Application of grease with a brush does not properly clean between the threads but merely applies a fresh layer of grease over the old.

With the foregoing in mind, it is an object of my invention to provide means for forcing grease under pressure through a closed system directly into the threaded connection. As new grease is forced into the threads, any old grease or contaminating materials are forced out ahead of the new grease. Thus a cleaning action takes place and only fresh uncontaminated grease remains.

Another object of the invention is to provide means for applying grease to the pipe threads while the well fluid is still flowing up through the pipe.

A further object of the invention is to provide means for applying grease to the pipe threads while the pipe is still rotating or spinning with the rotary work table.

It is an equally important object of my invention to provide greasing apparatus for forcing the grease under pressure directly into the box end of the pipe.

An additional object of my invention is to provide an applicator head which fits closely within a threaded box connection and seals at the bottom thereof to force grease under pressure upwardly through the threads.

Still another object of the invention is to provide a swiveled applicator head which may be rotated with the pipe while connected to the greasing apparatus.

It is also an object of the invention to provide an applicator head having relief openings therethrough to permit by-pass flow of well fluid and to balance the pressure above and below the head.

A still further object of the invention is to provide control means for accurately controlling the flow of the grease, and additional means for regulating the time rate of flow of the grease.

Yet another object of the invention is to provide greasing apparatus of the character described which is simply and durably constructed and includes quick coupling means for the interchange of applicator heads.

These and other objects and advantages of my invention will become apparent from the following detailed description of a preferred form thereof, and from an inspection of the accompanying drawings in which:

Figure 1 is a side elevation of the apparatus showing the applicator head positioned within the end of a pipe;

Figure 1A is a detail of the handle and head swivel taken at right angles to Figure 1;

Figure 2 is a section taken along the line 2—2 of Figure 1; and

Figure 3 is an enlarged cross-section taken along the radial planes 3—3 of Figure 2.

Referring now to the drawings and particularly to Figure 1 thereof, the numeral 10 designates the upper box end portion of a joint of drill pipe. As can be understood, the invention is intended to be used with any type of drill pipe, collars, casing, or tubing which are normally run into a well and joined together by threaded connections, such members being generically referred to in this application by the term "pipe." Extended through the center of pipe 10 is an internal bore 11 which permits the circulation of drilling fluid and the flow of well fluids from the bottom to the top of the well. The box end of the joint of pipe 10 has an upper internally threaded section 12 which is of greater diameter than bore 11, and is typically joined thereto by a tapered shoulder 13 as is best seen in the enlarged view of Figure 3. At the top of threaded section 12 is a short chamfer 14 which joins the upper rim of the pipe wall.

The preferred embodiment of my invention provides an applicator head 15 which is adapted to fit removably within the box end of pipe 10 to apply lubricant to the threaded section 12. Head 15 is connected to flexible conduit means 16 which are in turn connected to closed lubricant container 17. Upon the application of pumping pressure to container 17, the lubricant therein is forced through conduit means 16 into head 15 and thence into threaded section 12. An upper control valve 18 controls the flow of lubricant into head 15 so that an exact amount of lubricant can be placed in threaded section 12.

Container 17 is a large drum or tank which is adapted to hold a substantial amount of the thread lubricant. This lubricant is a heavy grease base compound which forms a thick coating on threaded section 12 and has sufficient fluidity so that it can be pumped through conduit means 16. A removable cover 20 is fitted over container 17 and has mounted thereon a pump unit 21 which is preferably of the type operated by air pressure supplied through an air line 22 past a shut-off valve 23. Pump 21 is of conventional design and has internal mechanism (not shown) which extends downwardly into container 17 to force lubricant therefrom upwardly through a discharge fitting 25 mounted on cover 20.

Coupled to discharge fitting 25 is a regulating valve 26 which regulates the time rate of flow of lubricant from container 17. Conditions such as the diameter of pipe 10 and the line pressure supplied to pump 21, determine the setting of valve 26 which is adjusted for the optimum flow rate. The first link of conduit means 16 is a pressure resistant flexible line or hose 28 which is extended between the regulating valve 26 and control valve 18. The length of hose 28 is such as to permit the location of container 17 at a desirable remote location on the floor of the well derrick or rig while control valve 18 is immediately adjacent the top of pipe 10. In the normal use of the apparatus, the top of pipe 10 will be extended several feet above a rotary work table or similar equipment which is used for rotating or turning the pipe. Since the most desirable time to apply lubricant to threaded section 12 is when the threaded connection between pipe joints is just disengaged or broken, it can be understood that an upper joint or stand of pipe 10 has just been broken and lifted clear of the pipe when the applicator head 15 is positioned within the box end of the pipe.

Control valve 18 is a quick acting, normally closed shut-off valve which is operated by an upper manual control lever or trigger 30 extended therefrom. As trigger 30 is depressed, valve 18 is opened to permit the flow of lubricant forwardly therethrough. Upon release of trigger 30, valve 18 is closed instantly thus permitting accurate control of the lubricant flow. Above applicator head 15 is a lifting handle 31 formed in the shape of a closed triangular loop and joined rigidly to a right angular pipe elbow or fitting 32. Extended upwardly from head 15 is a tubular connection 33 which is connected to fitting 32 through a swiveled coupling 34.

The purpose of swiveled coupling 34 is to rotatably connect head 15 to the remainder of the apparatus so that it may rotate with pipe 10. On many occasions, when the pipe joints have just been disconnected, the lower pipe joint 10 will be rotating with the rotary table by which it is supported. In order to avoid lost time, it is desirable to insert head 15 and apply the thread lubricant while pipe 10 is still rotating. As is best seen in Figure 1A, the tubular connection 33 extends upwardly into swivel 34 and is rotatably supported therein by a plurality of balls 35 mounted in annular races 36. Above the ball races 35–36 is an O-ring seal 37 to prevent external leakage of the thread lubricant.

Between fitting 32 and control valve 18 is a short length of flexible hose 38 which communicates the interior of fitting 32 and connection 33 with the interior of the valve. The length of hose 38 is adjusted to the individual operators to permit rapid operation of the apparatus. By means of handle 31, the operator moves head 15 into seating position within pipe 10. With his other hand, the operator then squeezes trigger 30 applying the proper amount of thread lubricant. As the application of lubricant is completed, the operator lifts head 15 clear of pipe 10, completing the entire operation in a matter of seconds. The lubricating apparatus is then moved clear of the work table until next joint of pipe is raised.

As is best seen in Figure 3, head 15 is formed with a heavy body of non-sparking material which is preferably of rubber-like composition. Extended downwardly in head 15 is a bore 40 which is closed at the bottom and is fitted at the top with a molded insert sleeve 41 that is threadedly engaged with connection 33. As is illustratively shown herein, the outer surface of the head is of tapered, frusto conical shape adapted to make a close fit with the thread crests of threaded section 12. At the top or outer end of threaded section 12, a small clearance is provided between head 15 and chamfer 14. Individual heads 15 are supplied for the different sizes and types of pipe used within the well, and if desired, a quick-connect coupling may be used between head 15 and connection 33 to permit rapid interchange of the heads.

The bottom of head 15 is provided with a beveled shoulder 42 which is adapted to seat in tight sealing engagement with pipe shoulder 13 to seal off threaded section 12 from the pipe bore 11. Thus lubricant forced outwardly into threaded section 12 cannot overflow and be spilled into pipe bore 11. As can be appreciated, the formation of head 15 from a rubber-like material facilitates the provision of a tight seal between shoulder 42 and shoulder 13, and avoids the use of separate sealing means.

Extended radially outwardly from bore 40 I provide port means, such for example as one or more ports 45 which open into threaded section 12. Ports 45 are preferably arranged as seen in Figure 2 in 90° spaced relationship so as to provide uniform lubricant distribution. Two sets of ports 45 are provided, one extending from the bottom of bore 40 and opening into the inner or bottom end of threaded section 12, and a second set extending approximately into the center of the threaded section. The outer end of each bore 45 intersects with a V-shaped upwardly extending channel 46 formed in the outer surface of head 15. Channels 46 aid in the circumferential distribution of lubricant and facilitate a more rapid and uniform application of lubricant around the threaded section 12.

As can be seen from the arrangement thus described, opening of control valve 18 forces lubricant under pressure through connection 33 into bore 40 and thence through ports 45. The space between head 15 and threaded section 12 is thus quickly and uniformly filled with lubricant under pressure. Some of this lubricant flows downwardly and stops at the sealed junction of shoulders 13 and 42, while the major portion of the lubricant flows upwardly towards the open space defined between head 15 and chamber 14.

During the flow of lubricant under pressure upwardly through the spiral turns of threaded section 12, a cleaning action takes place in which any old lubricant or foreign particles therein are driven ahead of the new lubricant towards chamfer 14. A pressure of several hundred pounds per square inch is used to force the lubricant into threaded section 12, and a thorough cleaning action is therefore achieved with the lubricant being forced into the roots of the thread grooves to remove any traces of material which might damage the threads upon subsequent connection to the threads of another pipe joint. In the operation of the apparatus, the operator holds valve 18 open until he sees the lubricant rise near the top of chamfer 14. He is then sure that the entire length of threaded section 12 is filled with new lubricant and that any foreign matter has been displaced out of the threads.

To complete the apparatus, it is highly advantageous to provide separate relief passage means, such for example as one or more relief passageways 48 which extend vertically through head 15 from the top to the bottom thereof. As seen in Figure 2, passageways 48 are spaced equidistantly between ports 45 and are completely separate therefrom. These passageways 48 serve two purposes in the apparatus. First, under normal conditions when the pipe 10 is relatively dry and free of well fluid, there may be a pressure drop between the exterior and interior of the pipe due to the existence of a partial vacuum within the pipe string. When such a pressure differential exists, head 10 would act as a plug if it were solid, and would be extremely difficult to remove once seated within the pipe. The relief passageways 48 prevent such a pressure unbalance by permitting the free flow of gases or liquids through head 15.

Secondly, and more important, the passageways 48 permit the application of lubricant to the threaded section 12 under conditions wherein well fluid is flowing freely up pipe 10 and over the top thereof. The seal between shoulders 42 and 13 shuts off threaded section 12 from bore 11, while the passageways 48 permit by-pass flow of fluid up through head 15 so as not to interfere with seating of the head or the application of the lubricant.

While I have thus described in some detail a preferred form of apparatus for carrying out my invention, it is to be understood that the method disclosed of applying lubricant to an internally threaded connection is also novel. The advantages and objects of applying lubricant under pressure while the pipe is rotating and full of well fluid have been previously described and need not be repeated. Therefore, I do not wish to be limited to the details of the apparatus described herein except as defined in the appended claims.

I claim:

1. In a lubricant applicator for the box end threaded section of well pipe, the combination of: flexible conduit means adapted to be connected to a source of lubricant under pressure; an upstanding lifting handle connected to said conduit means at right angles thereto; a swiveled tubular connection joined to said conduit means and extending downwardly below said handle; and a head of rubber-like material rotatably mounted on said connection, said head being of tapered shape adapted to seat within the box end of said pipe to form a ring of sealing contact with said pipe below the inner end of said threaded section, the body of said head extending upwardly in close fit with the threads and having a slight clearance with said pipe at the outer end of said threads, said head having a central bore extending downwardly therein in communication with said connection and a plurality of radially extending discharge ports opening outwardly near the inner end of said threaded section, each of said ports intersecting with upwardly directed channels formed in the outer surface of said body.

2. In a lubricant applicator for the box end threaded section of well pipe, the combination of: conduit means adapted to be connected to a source of lubricant under pressure; an applicator head shaped to fit removably within said pipe to seal against said pipe at the bottom end of said threaded section, said head being connected to said conduit means and having discharge port means therein for discharging lubricant under pressure into said threaded section and separate relief passage means extended vertically therethrough and spaced from said discharge port means.

3. In a lubricant applicator for the box end threaded section of well pipe, the combination of: conduit means adapted to be connected to a source of lubricant under pressure; an applicator head shaped to fit removably within said pipe to seal against said pipe at the bottom end of said threaded section, said head having discharge port means therein for discharging lubricant under pressure into said threaded section and separate relief passage means extended vertically therethrough and spaced from said discharge port means; and swivel means rotatably connecting said head to said conduit means.

4. In a lubricant applicator for the box end threaded section of well pipe, the combination of: conduit means adapted to be connected to a source of lubricant under pressure; a head of non-sparking material having a tapered shape and adapted to seat within the box end of said pipe to form a ring of sealing contact with said pipe below the inner end of said threaded section, the body of said head extending upwardly in close fit with the threads and having a slight clearance with said pipe at the outer end of said threads, said head having radially directed discharge port means therein for discharging lubricants under pressure into said threaded section and separate relief passage means extended vertically therethrough and spaced from said discharge port means; and swivel means rotatably connecting said head to said conduit means.

5. In a lubricant applicator for the box end threaded section of well pipe, the combination of: conduit means adapted to be connected to a source of lubricant under pressure; a swiveled tubular connection joined at right angles with said conduit means and extending downwardly therefrom; and a head of rubber-like material rotatably mounted on said connection, said head being of tapered shape adapted to seat within the box end of said pipe and having a lower beveled surface adapted to form a ring of sealing contact with said pipe below the bottom end of said threaded section, said head having a central bore extended downwardly therein and in communication with said connection and radially extending discharge port means in communication with said bore and opening outwardly near the bottom end of said threaded section, and said head having separate relief passage means extended vertically therethrough and spaced from said discharge port means and said central bore.

6. In a lubricant applicator for the box end threaded section of well pipe, the combination of: conduit means adapted to be connected to a source of lubricant under pressure; a regulating valve in said conduit means for regulating the rate of flow of lubricant therethrough; an upstanding handle connected to said conduit means at right angles thereto; a swiveled tubular connection joined at right angles with said conduit means and extending downwardly therefrom; and a head of rubber-like material rotatably mounted on said connection, said head being of tapered shape adapted to seat within the box end of said pipe and having a lower beveled surface adapted to form a ring of sealing contact with said pipe below the bottom end of said threaded section, said head having a central bore extended downwardly therein and in communication with said connection and radially extending discharge port means in communication with said bore and opening outwardly near the bottom end of said threaded section, and said head having separate relief passage means extended vertically therethrough and spaced from said discharge port means and said central bore.

7. In a lubricant applicator for the box end threaded section of well pipe, the combination of: conduit means adapted to be connected to a source of lubricant under pressure; a swiveled tubular connection joined at right angles with said conduit means and extending downwardly therefrom; and a head of rubber-like material rotatably mounted on said connection, said head being of tapered shape adapted to seat within the box end of said pipe and having a lower beveled surface adapted to form a ring of sealing contact with said pipe below the bottom end of said threaded section, said head having a central bore extended downwardly therein and in communication with said connection and a plurality of radially extending discharge ports in communication with said bore and opening outwardly near the bottom end and center of said threaded section, and each of said ports intersecting with upwardly directed channels formed in the outer surface of said body, said head having separate relief passage means extended vertically therethrough and spaced from said discharge ports and said central bore.

References Cited in the file of this patent
UNITED STATES PATENTS

| 1,510,581 | Boynton | Oct. 7, 1924 |
| 2,059,704 | Miller | Nov. 3, 1936 |
| 2,246,874 | Burge et al. | June 24, 1941 |
| 2,642,034 | Griffin | June 16, 1953 |
| 2,655,287 | Campbell | Oct. 13, 1953 |